United States Patent [19]

Ikedo et al.

[11] Patent Number: 4,811,324
[45] Date of Patent: Mar. 7, 1989

[54] DOUBLE-SIDED DISK PLAYER

[75] Inventors: Yuji Ikedo; Takahiro Okajima, both of Saitama, Japan

[73] Assignee: Pioneer Electronic Corporation, Tokyo, Japan

[21] Appl. No.: 138,107

[22] Filed: Dec. 28, 1987

[30] Foreign Application Priority Data

Dec. 27, 1986 [JP] Japan .................................. 61-315413
Dec. 27, 1986 [JP] Japan .................................. 61-315414
Dec. 27, 1986 [JP] Japan .................................. 61-315415

[51] Int. Cl.$^4$ ............................................. G11B 21/16
[52] U.S. Cl. ..................................... 369/75.2; 369/195; 369/199; 369/244
[58] Field of Search ...................... 369/75.2, 195, 199, 369/244

[56] References Cited

U.S. PATENT DOCUMENTS 2,837,338  6/1958  Andres ................................. 369/195
4,566,087  1/1986  Kraft .................................... 369/34
4,680,748  7/1987  Kobayashi ........................... 369/75.2

Primary Examiner—Steven L. Stephan
Attorney, Agent, or Firm—Sughrue, Mion, Zinn, Macpeak & Seas

[57] ABSTRACT

A disk player for double-side disks, such as video disks, having a reduced overall size and simplified structure. The pickup, spindle, spindle motor, and disk clamper of the player are mounted on a rotary frame. To change from playing one side of the disk to the other, the disk is conveyed out of the player, the rotary frame is rotated through 180 degrees, and the disk conveyed back into the player. The disk is then again clamped against the spindle and played.

9 Claims, 8 Drawing Sheets

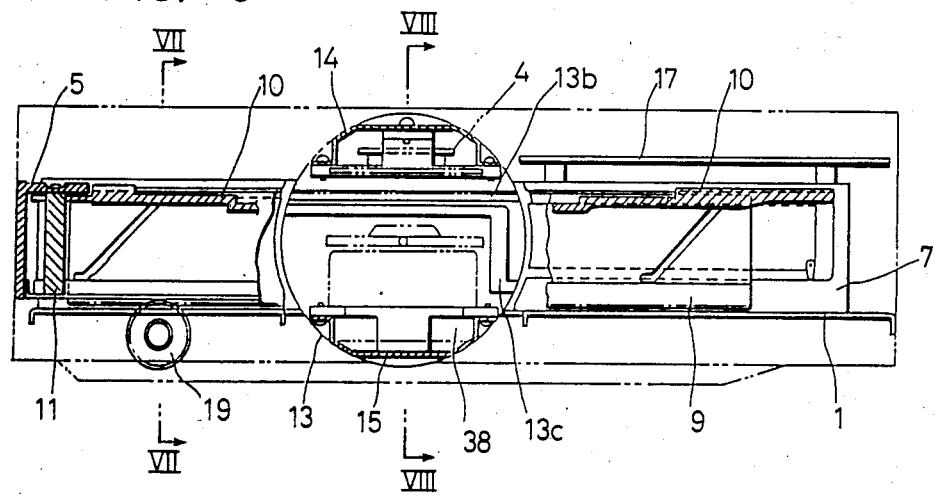
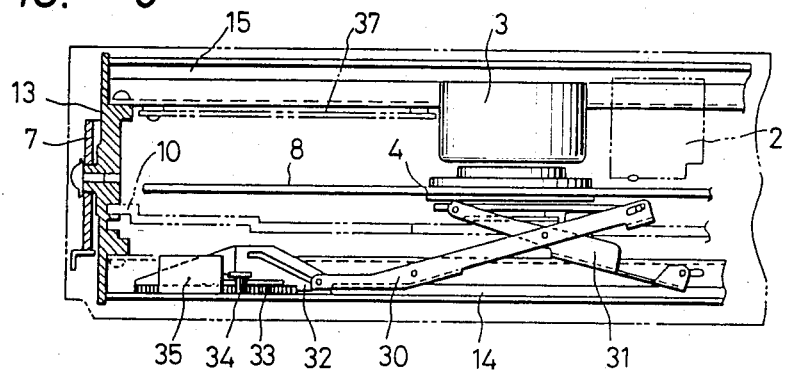
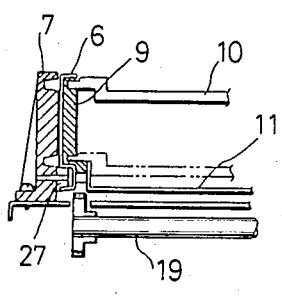
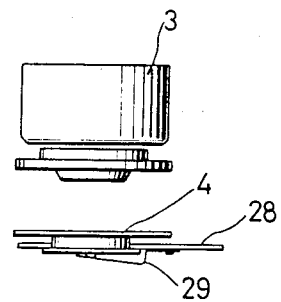

DOUBLE-SIDED DISK PLAYER

BACKGROUND OF THE INVENTION

The present invention relates to an improved double-sided disk player for reproducing signals recorded on both sides of a disk such as a compact disk, an optical video disk, a computer disk, or the like.

Generally, the playing time for one side of a present type video disk is about 60 minutes. In order to record a movie or the like having a total playing time greater than 60 minutes, it is desirable to record continuously on both a front surface (A side) and a rear surface (B side) of the disk.

Further, in a format for high definition television being considered for future use, the playing time for one side is shortened because the information content per unit playing time must be increased.

In view of such background, it is considered that the demand for double-sided disk players will be high in the future.

Examples of double-sided disk players which have previously been proposed include a disk player provided with two pickups for the respective A and B sides, a disk player provided with a device for reversing the disk while holding it, a disk player of the pickup reverse type as disclosed in Japanese Utility Model Unexamined Publication No. 61-114558 and as shown in FIGS. 1 and 2, etc.

As shown in FIG. 1, in the disk player of the pickup reverse type, the position of the pickup is reversed from the A side to the B side after the pickup has been moved by half or more of the diameter D of the disk, as shown by a broken line in the drawing, whereafter reproduction of the B side of the disk is carried out.

In the above disk player of the pickup reverse type, a distance D/2 of 15 cm must be provided to allow for movement of the pickup (for a standard video disk size D of 30 cm), and therefore the overall length of the player must be more than 45 cm. As a result, the disk player cannot be accommodated in a standard size cabinet matching the size of, for example, standard audio equipment.

In a disk player provided with two pickups, on the other hand, the second pickup and necessary switching circuit add considerably to the total cost of the player.

Moreover, in both systems described above there is a problem in the case of a disk such as a video disk having its A side and B side manufactured separately then bonded together in that the amount of eccentricity in reproducing the B side may be larger than for the A side if a displacement is present between the centers of the two sides.

On the other hand, in the system in which the disk is reversed, a space of at least the diameter of the disk is required. Accordingly, it is impossible to reduce the size of the system to that acceptable for general consumer use.

Moreover, a pickup requires a certain height relative to the disk surface. Accordingly, in a player provided with two pickups for the respective A and B sides, or in a player of the type in which the pickup is reversed, it is required to provide a height at least twice the height from the center plane of the disk to the top of one pickup.

Further, in a player of the type in which the disk is reversed, it is required to provide at least a space of a height equal to the diameter of a disk. Accordingly, the disk player has the disadvantage that not only the disk player has a large height making it impossible to make the disk player compact, but also the disk player is complicated in structure so that its cost is high.

SUMMARY OF THE INVENTION

The present invention has been attained to eliminate the above disadvantages in the conventional double-sided disk player.

More specifically, an object of the invention is to provide a double-sided disk player of the disk conveying type which can be reduced in size so that the size is substantially the same as that of a single-sided disk player, and in which the total cost is not as high as in the case where two pickups are provided.

It is a further object of the invention to provide a double-sided disk player in which the overall height of the player is reduced and the cost is low.

A still further object of the invention is to provide a double-sided disk player in which the positions of the spindle motor for rotating the disk and the clamper are reversed while the disk is moved from the play position to the outward conveyed position and in which the disk can be conveyed between the spindle and the clamper even if the height of the disk player is reduced to the lowermost limit.

In order to achieve the above-mentioned objects, the present invention provides a double-sided disk player in which a disk is conveyed to a stand-by position by conveyer means for conveying the disk from the stand-by position to a playing position, the disk is rotated while the disk is being conveyed to the stand-by position, a rotary frame for reading out a signal by a pickup is reversed, the disk is returned to the playing position, and then the other side of the disk is reproduced.

In further satisfaction of the above and other objects, the invention provides a disk player in which the rotary frame is reversed while the disk is conveyed to the stand-by position by the conveyer means for conveying the disk from the stand-by position to the play position to thereby carry out double-sided playing, and the spindle and the clamper are attached to the rotary frame in such a manner that the spindle and the clamper are biased with respect to the rotary center of the rotary frame by an amount corresponding to the displacement of the distance between the spindle and the clamper to one side due to a difference in height between the spindle and the clamper, and the disk conveying path of the conveyer means is changed by an amount corresponding to the above bias.

Further in accordance with the above-mentioned objects, the invention provides a double-sided disk player in which the tray for conveying the disk is lowered after horizontal movement when the A side is played, while the tray is moved horizontally after lowering when the B side is played, and then the disk is pressed by the clamper so as to be set on the spindle.

BRIEF DESCRIPTION OF THE DRAWINGS

FIGS. 3 through 11 show a preferred embodiment of the present invention of which FIG. 3 is an exploded perspective view, FIG. 4 is a plan view, FIG. 5 is a vertical side section, FIG. 6 is a cross-section taken on a line IV—IV in FIG. 5, FIG. 7 is a cross-section taken on a line V—V in FIG. 5, FIG. 8 is a side view showing a spindle motor and a clamper, FIGS. 9-1 and 9-2 are schematic views showing conveying states in playing an A side, FIG. 9-3 is a schematic view showing a process of conveying a disk, FIGS. 10-1 and 10-2 are schematic views showing conveying states in playing a B side, FIG. 10-3 is a schematic view showing a process of conveying a disk, FIGS. 11-1 and 11-2 are side views showing the operations of a movable member in playing the A and B sides, respectively;

FIGS. 14-1 through 15-3 show a further embodiment of which FIGS. 15-1 and 15-2 are schematic views showing conveying states in playing an A side, and FIGS. 15-1 through 15-3 are schematic views showing conveying states in playing a B side.

DESCRIPTION OF THE PREFERRED EMBODIMENTS

Referring to FIGS. 3 through 11, preferred embodiments of the present invention will be described hereunder.

Figure 3:
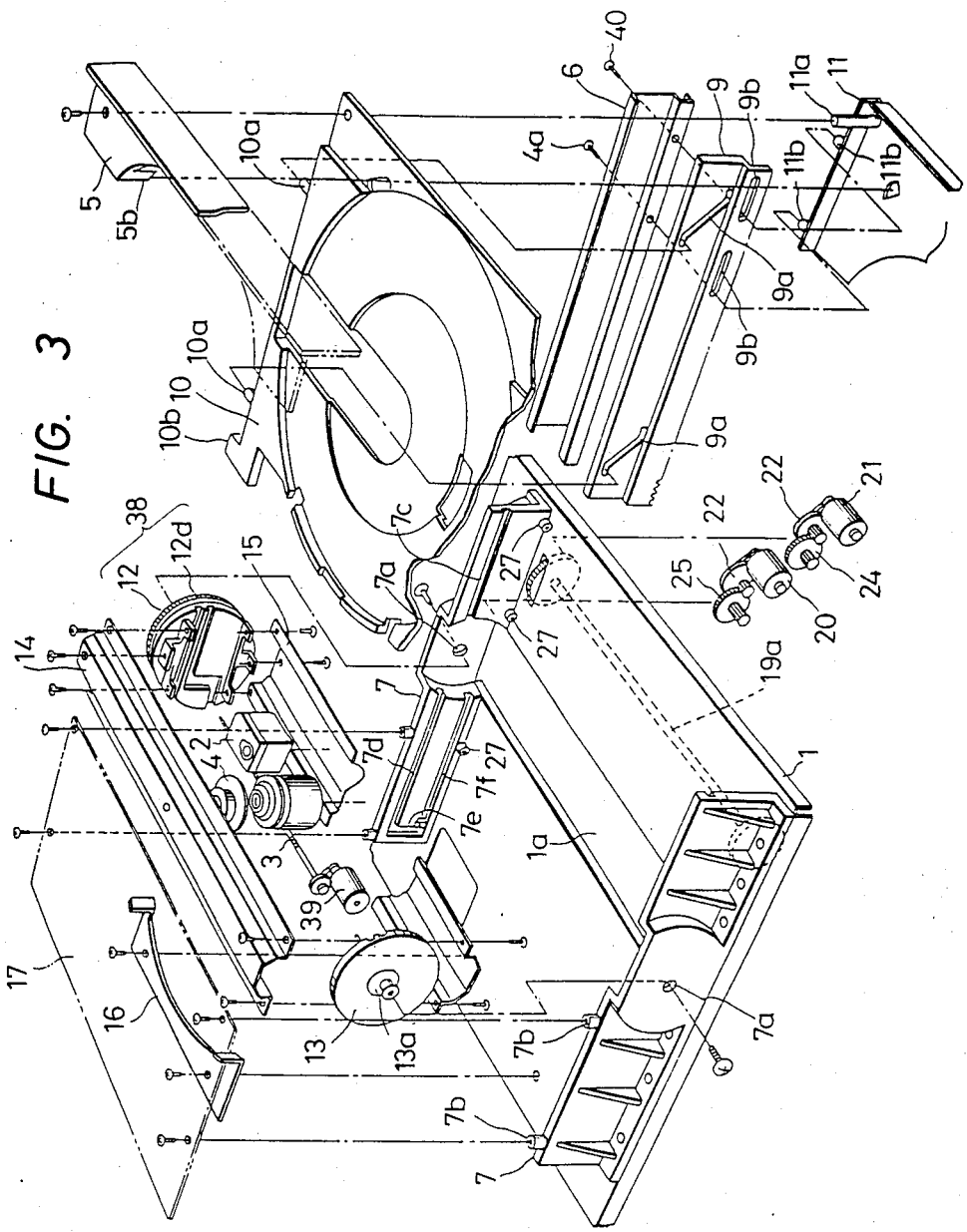
Figure 4:
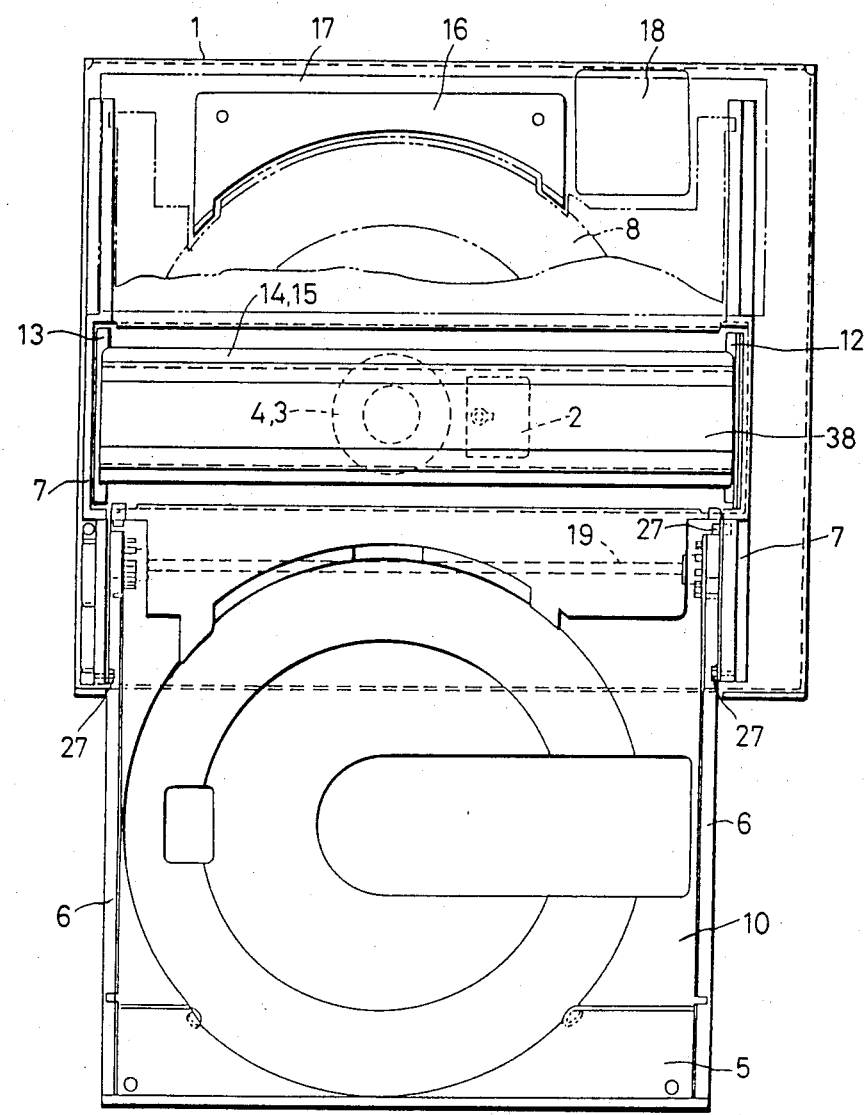

In FIG. 3, reference numeral 1 designates a chassis. Side guides 7 are fixed to the chassis 1 at its left and right sides. An opening 1a, in which a rotary frame 38 described below is rotatably mounted, is provided in the chassis 1 substantially at its central portion.

A disk guide 16 is attached to the chassis 1 at a position corresponding to the maximum outer diameter of a disk 8. A gear shaft 19a provided with synchronizing gears 19 at its opposite sides and engaged with racks 9 is borne by the chassis and a gear 24 engaged with one of the synchronizing gears 19 so as to rotate the same, a loading motor 21 for driving the gear 24, and an intermediate gear 22 are mounted on the chassis 1.

Further, bearing holes 7a are formed in the respective side guides 7, and a shaft 13a for connecting a right-side frame 12 and a left-side frame 13, which constitute the rotary frame 38, is rotatably borne in the bearing holes 7a.

A gear 12d is formed on the outer circumference of the right-side frame 12. A gear 25 engaged with the gear 12d, a reversable motor 20 for driving the gear 25, and an intermediate gear 22 are attached to the frame 1.

A circuit substrate 17 is attached to the side guides 7 through bosses 7b of the side guides 7, and guide rollers 27 for guiding side angle members 6 are pivoted on the side guides 7.

Further, horizontally linear guide surface 7c and 7d, a vertical guide surface 7e continued to the guide surface 7d, and a horizontal guide surface 7f extended from the lower end of the guide surface 7e toward the guide surface 7c are formed on each of the opposite surfaces of the side guides 7, and a movable member 36 is pivoted at the intersection of the guide surfaces 7e and 7f on each of the side guides 7.

The right-side frame 12 and the left-side frame 13 constituting the rotary frame 38 are connected by a clamper frame 14 and a spindle frame 15 so as to be integrated with each other.

A spindle motor 3, a head amplifier substrate 37 (FIG. 6), a pickup 2, a driving mechanism for guiding and driving the pickup 2 in the tracking direction, a motor 39 for powering the driving mechanism, and a tilt driving mechanism (not shown) for following warp of a disk are attached to the spindle frame 15.

As shown in FIGS. 6 and 8, a clamper 4, a clamper plate 28 for holding the clamper 4, and a mechanism for driving the clamper plate 28 parallel to the clamper frame 14 are attached to the clamper frame 14.

The driving mechanism is constituted by a clamper motor 35, a worm wheel 34 rotated by the clamper motor 35, a clamper gear 33, a clamp cam 32 slid by the clamper gear 33, a clamp lever 30 operated at one end by the clamp cam 32, and a subsidiary lever 31 crossing the clamp lever 30.

The clamp cam 32 is moved by rotation of the clamper motor 35 to change the angle of the clamp lever 30 so as to rotate also the subsidiary lever 31 at the same angle as the clamp lever 30 to thereby move the clamper plate 28 in a parallel motion.

A plate spring 29 for urging the clamper 4 toward the spindle motor 33 is fixed to the clamper plate 28.

The shaft 13a provided between the right- and left-side frames 12 and 13 substantially at the central portion in the vertical direction of the spindle motor 3 and the clamper 4.

A cam groove 13b for making the guide grooves 7c and 7d communicate with each other at the normal position of the rotary frame 38 and a generally Z-shaped cam groove 13c for communicating the grooves 7c and 7f with each other at the reversed position of the rotary frame 38 are provided on each of the opposing surfaces of the right- and left-side frames 12 and 13.

Cam grooves 9a and elongated holes 9b having a length substantially equal to that of the cam groove 9a are formed in each of the racks 9. Bosses 11b of a tray base 11 are inserted into the respective elongated holes 9b, and each of the side angle members 6 is attached to the bosses 11b with screws 40.

The side angle members 6 are made slidably by the rollers 27 of the side guides 7 so that also the tray base 11 is slidable together with the side angle members 6.

Bosses 11a are projectingly provided on the tray base 11 which are inserted into holes in the tray 10 to guide the tray 10 for vertically movement. Pins 10a of the tray 10 are inserted into the slanting cam grooves 9a, and a tray name plate 5 having a guide portion 5a provided at a position corresponding substantially to the maximum outer diameter of the disk 8 is attached at the upper ends of the bosses 11a.

Transversely elongated pins 10b (shown in FIG. 11) are projectingly provided on the tray 10 and inserted into the guide grooves 7c, 7d, 7e, and 7f of the side guides 7 and the cam grooves 13b and 13c of the right- and left-side frame 12 and 13 so as to be slidable in those grooves.

Figure 1:
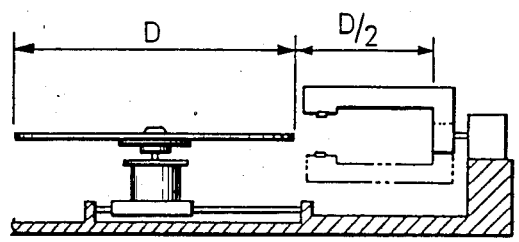
FIG. 1 is a schematic cross-section of a conventional player.
Figures 1, 9:
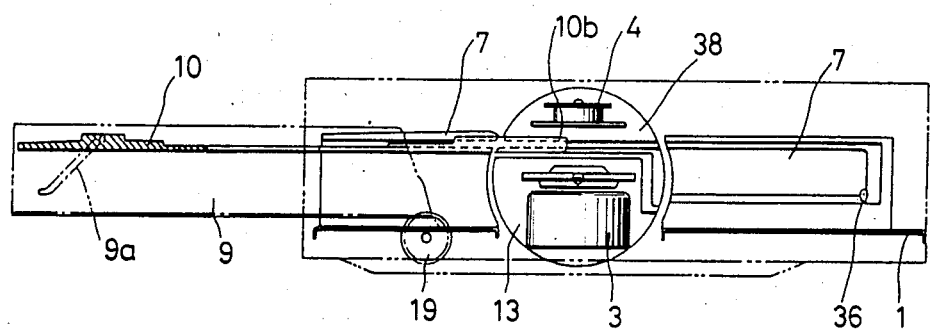
Figures 2, 9:
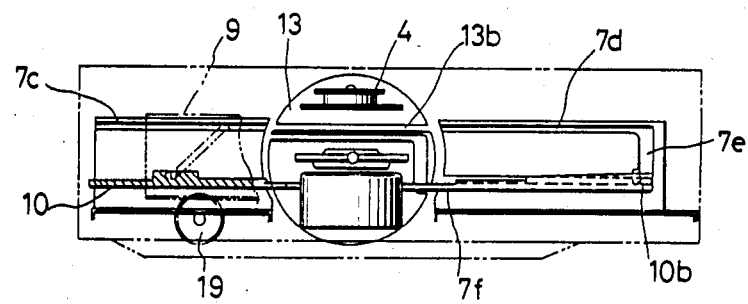
Figures 3, 9:
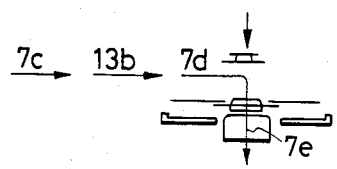

Referring to FIG. 9-1 to 9-3, the operation of the double-sided disk player in the case where the A side of a disk is played will be described hereunder.

First, in accordance with an "open" command, the tray 10 is projected by rotation of the loading motor 21 to the mount position of the disk 8 projected in a more leftward direction than the state shown in FIG. 9-1.

At that time, upon the generation of a "reproduction" command with the disk 8 mounted on the tray 10, the loading motor 21 is reversely rotated to rotate one of the synchronizing gears 19 so that the left and right racks 9 are driven by the synchronizing gears 19 to move parallel to each other.

Although the pins 10a of the tray 10 are subject to horizontal and downward forces by the slanting cam grooves 9a of the racks 9 due to the parallel movement of the racks 9, the tray 10 cannot be lowered because the pins 10b of the tray 10 are inserted into the guide grooves 7c of the side guides 7.

Therefore, the tray 10 is moved together with the racks 9 in the direction of the movement of the racks 9, that is, in the inward conveying (retracting) direction.

In the playing operation for the A side, the rotary frame 38 is in the position of FIG. 9-1, that is, the cam groove 13b is on a line connecting the guide grooves 7c and 7d, so that the pin 10b passes through the guide groove 7c, the cam groove 13b, and the guide groove 7d and then abuts the inner end of the guide groove 7d. The pin 10b cannot be moved further in the inward conveying direction of the tray 10.

However, the racks 9 can continue to move further in the inward conveying direction so that the pins 10a of the tray 10 are subject to a lowering force by the slanting cam grooves 9a so as to move downward in the grooves 7e, thereby lowering the tray 10.

The disk 8 is mounted on the spindle motor 3 by the lowering of the tray 10, and the tray 10 is further lowered so that the tray 10 is separated from the disk 8.

Figures 1, 11:
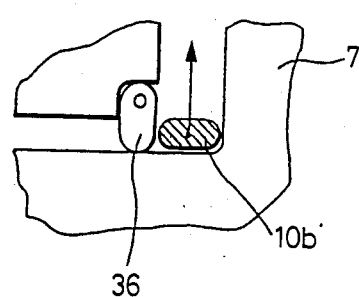
Figures 2, 11:
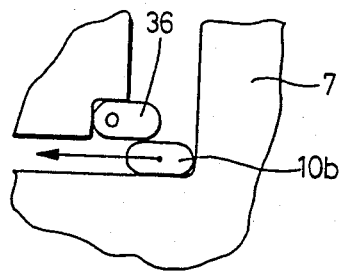

When the pins 10b of the tray 10 are lowered to the lowermost ends of the respective guide grooves 7, the pins 10b abut the movable members 36 so as to be rotated in the state shown in FIG. 11-1.

In synchronism with the mounting of the disk 8 on the spindle motor 3 by the lowering of the tray 10, the clamp motor 35 is made to rotate to move the clamp cam 32 to thereby vertically move the clamp lever 30 and the subsidiary lever 31 so as to lower the clamp plate 28 so that the clamper 4 is mounted on the disk 8.

The clamper plate 28 is further lowered so as to urge the clamper 4 by the force of the plate spring 29 so that the clamper 4 and the disk 8 are urged against the spindle motor 3 by the spring force.

The steps to this state are diagrammatically shown in FIG. 9-3.

When this state has been reached, the spindle motor 3 and the pickup 2 are operated in a known manner to reproduce the A side of the disk.

Figures 1, 10:
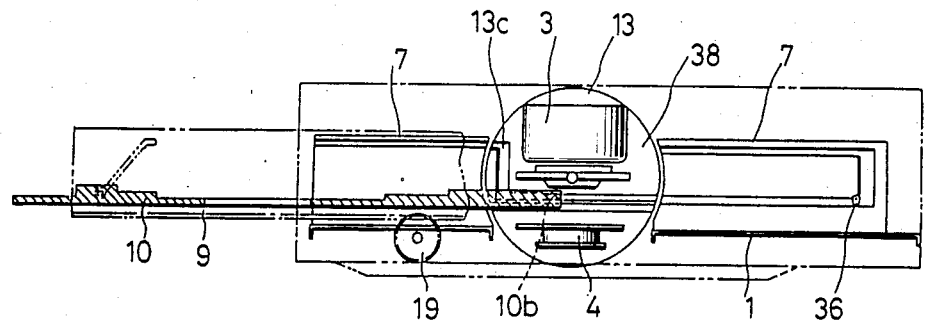
Figures 2, 10:
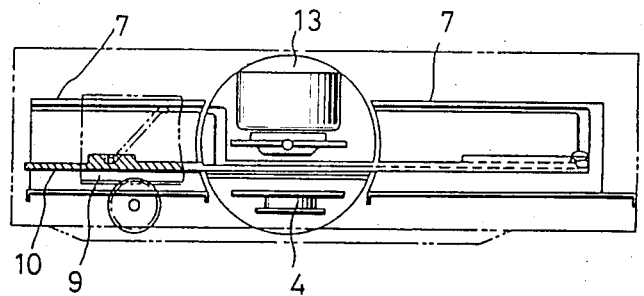
Figures 3, 10:
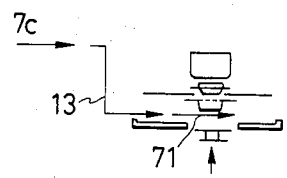

Referring to FIG. 10, the operation in the period after playing the A side and prior to playing the B side will be described hereunder.

After completion of the playing of the A side, the clamper motor 35 rotates in the reverse direction to that in the case described above to thereby horizontally move the clamp lever 30 and the subsidiary lever 31 so as to raise the clamper plate 28 and thereby raise the clamper 4 from the disk 8 to separate the former from the latter. At that time, the loading motor 21 rotates in the reverse direction to the inward conveying direction so as to move the racks 9 in the outward conveying direction.

However, since the pins 10b of the tray 10 are prevented from moving to the guide grooves 7f by the movable members 36 as shown in FIG. 11-1, the tray 10 cannot be moved in the outward conveying direction. Therefore, the pins 10a of the tray 10 are raised by the slanting cam grooves 9a of the racks 9 so that the tray 10 is raised and the disk 8 is mounted on the tray 10.

When the pins 10b have been raised to the upper ends of the guide grooves 7c so that the pins 10b cannot be further raised, the tray 10 is moved by the pins 10a in the outward conveying direction as the racks 9 move in the outward conveying direction, that is, each pin 10b is guided by the guide groove 7d, the cam groove 13b, and the guide groove 7c, so that the tray 10 reaches the position where the disk 8 was initially mounted on the tray 10.

The rotary frame 38 never touches the tray 10 and the disk 8 at that position when the rotary frame 38 rotates.

When the tray 10 has reached that position, the reversal motor 20 is rotated so that the reversal so that the reversal gear 25 and the gear 12d of the right-side frame 12 are engaged with each other so as to rotate the rotary frame 38 by 180 degrees, whereupon the spindle motor 3 and the clamper 4 are reversed in position.

At that time, the cam grooves 13c of the right- and left-side frames 12 and 13 are communicated with the guide grooves 7c on the inward conveying side of the tray 10 with the guide grooves 7f on the inner side of the tray 10.

Thus, upon completion of the reversal of the rotary frame 38, the loading motor 21 is rotated in the inward conveying direction so as to move the racks 9 in the inward conveying direction.

Accordingly, the tray 10 is also moved in the inward conveying direction. When the pins 10b reach the vertical portions of the cam grooves 13c, the tray 10 cannot move further in the inward conveying direction, and the pins 10a are guided by the slanting cam grooves 9a so that the tray 10 is lowered.

Upon completion of the lowering of the tray 10, the pins 10b enter the guide grooves 7f through the horizontal portions of the cam grooves 13c to thereby convey the tray 10 to the innermost position.

Figure 2:
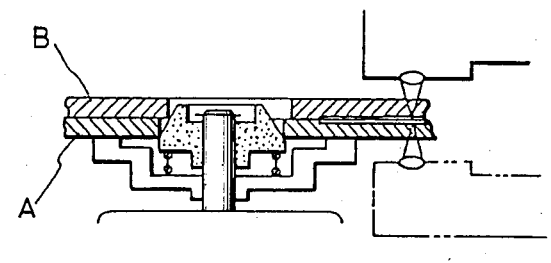
FIG. 2 is a cross-section showing the state in which a spindle is fitted to a disk.

At that time, the pins 10b rotate the respective movable member 36, as shown in FIG. 11-2, so that the pins 10b cannot be raised.

The reason why the tray 10 is lowered in the midposition in the manner described is that a gap between the spindle motor 3 and the clamper 4 is moved down below the rotary center of the rotary frame 38.

When the tray 10 has reached the innermost position, the clamper motor 35 is rotated so as to vertically rotate the clamper arm 30 and the subsidiary arm 31 to thereby raise the clamper plate 28.

Similarly to the case of playing the A side, the raised clamper plate 28 causes the clamper 4 to abut the disk 8 and the spindle motor 3 to thereby enable rotation of the disk 8 by the spindle motor 3.

Thus, since the disk 8 is set on the spindle motor 3 by the raising of the clamper 4, unlike the case of playing the A-side, it is not necessary to raise the tray 10.

The above operation is schematically illustrated in FIG. 10-3.

After the above operation, the spindle motor 3 and the pickup 2 are operated to reproduce the B side similarly to the case of the A side.

Next, a description will be given concerning the outward conveying operation of the disk 8 after the completion of the playing of the B side or in accordance with an "open" command.

Upon completion of the playing of the B side or when an "open" command is issued, the clamper motor 35 is rotated in the same direction as that upon completion of playing the A side so as to separate the clamper 4 from the disk 8, similarly to the case of the A side.

The loading motor 21 is rotated in the outward conveying direction to thereby move the racks 9 in the outward conveying direction. At that time, the movable member 36 rotate in the direction to prevent the pins 10b from rising so that the tray 10 cannot be raised.

Accordingly, the tray 10 is moved together with the racks 9 in the outward conveying direction.

The pins 10b reach a bent portions of the cam grooves 13c through the guide grooves 7f and are thereby prevented from moving in the outward conveying direction.

Therefore, the pins 10a are raised by the slanting cam groove 9a of the racks 9 so that the tray 10 is raised and the pins 10b reach the bent portions of the cam grooves 13c to thereby be prevented from raising, and the tray 10 is returned through the cooperation of the cam grooves 13c and the guide grooves 7c to the position at which the disk 8 was initially mounted on the tray 10. The disk 8 can then be removed.

Although the above description relates to the case in which the A side and the B side are succeedingly played, it is possible to stop the playing operation after the completion of the playing of the A side, to play only the B side, or to play the A side after playing the A side.

Figure 12:
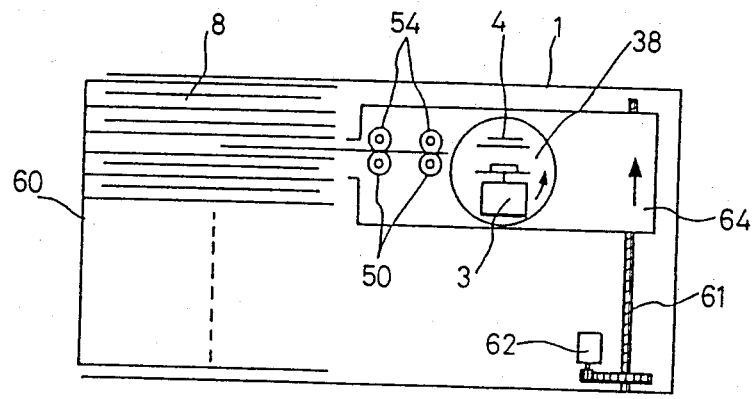
FIGS. 12 and 13 are schematic cross-section of another embodiment and a schematic cross-section of a playing apparatus of the same.
Figure 13:
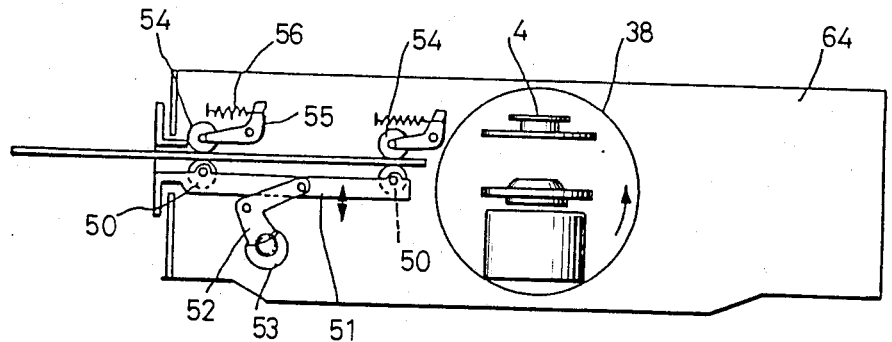

Moreover, although the above embodiment has been illustrated with respect to a player in which a tray is used as the disk conveyer device, the conveyer device is not limited to such a tray. As an example, a second embodiment in which feed rollers are used as the disk conveyer device will be described with reference to FIGS. 12 and 13.

In the second embodiment, disks 8 are accommodated in a magazine 60 on shelves arranged parallel to each other.

A playing apparatus 64 having a rotary player 38 to which a spindle motor 3, a clamper 4, etc., similar to those in the first embodiment, are attached is vertically conveyed by a feed screw 61 rotated by a selection motor 62.

The playing apparatus 64 is provided with two pairs of feed rollers constituted by a pair of conveying rollers 50 and a pair of pressing rollers 54.

The conveying rollers 50 are borne by a roller base 51 and are driven by a roller motor (not shown), the roller base 51 being attached to a driving plate 52 rotated by a driving motor 53.

The pressing rollers 54 are urged toward the conveying rollers 50 by springs 54 engaged with arm rods 55 pivotally supporting the pressing rollers 55.

In the double-sided disk player of the second embodiment, the conveying rollers 50 are separated from the pressing rollers 54 by rotation of the driving motor 53.

When a disk to be played is externally designated, the selection motor 62 is rotated, the playing apparatus 64 is raised/lowered to a predetermined height, and the designated one of the disks 8 is pushed out of the magazine 60.

Then, the driving motor 53 is rotated, and the pushed-out disk 8 is sandwiched by the conveying rollers 50 and the pressing rollers 54 so as to be fed between the spindle motor 3 and the clamper 4.

Upon completion of the feeding movement, the conveying rollers 50 are separated from the pressing rollers 54 so as to free the disk 8, and then the clamper 4 urges the disk 8 against the spindle motor 3 so as to start playing.

Upon the completion of playing, the rotary frame 28 is reversed while the disk 8 is sandwiched by the conveying rollers 50 and the pressing rollers 54 so as to be conveyed to the original position so that the opposite side of the disk 8 can be played, similarly to the operation described above.

It should be noted that the movement of the pickup 2 is not limited to the vertical direction, and the reversing angle of the rotary frame 38 is not limited to that employed in the above-described embodiments, for example, as illustrated in FIGS. 14-4 through 15-2.

These figures show a playing apparatus in which a tray 10 on which a disk 8 is to be mounted is guided by a guide roller 70. A guide plate 71 for supporting the guide roller 70 is moved by links 72 so that the inward conveying direction of the tray 10 is changed by the guide roller 70.

Figures 1, 14:
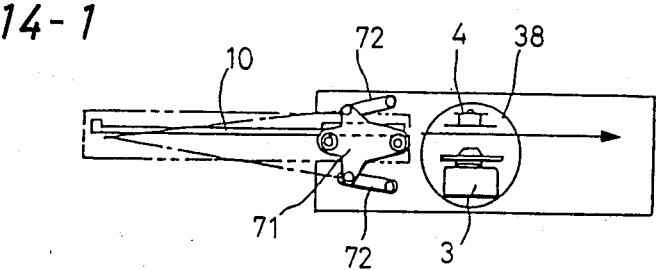
Figures 2, 14:
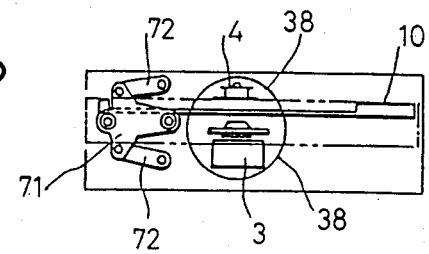
Figures 1, 15:
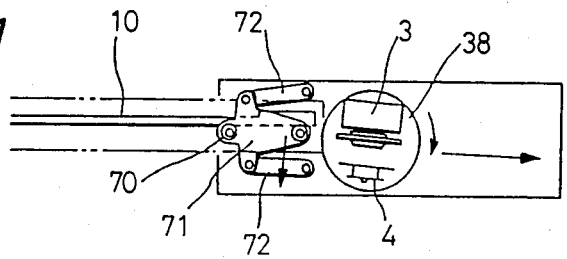
Figures 2, 15:
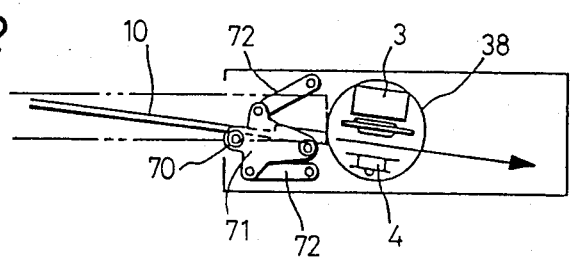
Figures 3, 15:
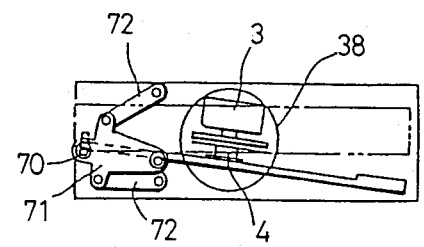

As shown in FIGS. 14-1 and 15-1, it is not necessary to reverse the rotary frame 38 by 180 degrees.

Although the above embodiments have been illustrated with respect to the case where the A and B sides of the disk are integrated with each other or bonded to each other, two disks each having only one playing surface, such as audio compact disks, may be played if the two disks are placed back to back.

Further, although the separately provided clamper motor 35 is used for the operation of the clamper 4 in the embodiments described above, power from the loading motor may be extracted through a clutch mechanism of a type disclosed in Japanese Patent Application No. 59-029308.

Similarly, output power from the loading motor may be extracted through a clutch mechanism in place of the reverse motor 20.

For the pickup 2, a pickup of the optical type or of the VHD electrostatic capacitance type can be used for a disk on which a digital signal is recorded, while an analog pickup is used for a record on which a sound groove is recorded.

Although the rotary center of the rotary frame 38 is biased from the position between the spindle and the clamper in order to reduce the outer diameter of the rotary frame 38 in the embodiment described above, the rotary center may be aligned with a position between the spindle and the clamper so as to simplify the structure if the outer diameter of the rotary frame 38 and the height of the disk player are increased.

Furthermore, the direction of conveying the tray 10 may be changed in the manner illustrated in FIGS. 14-1 through 15-3, or other arrangements may be used in which rollers are used for conveying the disk 8 and the direction of conveying the tray 10 is changed by the movement due to the reversal of the gap between the spindle motor 3 and the clamper 4.

FIGS. 14-1, 14-2 and FIGS. 15-1 through 15-3 show a playing apparatus in which a tray 10 on which a disk 8 is to be mounted is guided by guide roller 70. A guide plate 71 for supporting the guide roller 70 is moved by links 72 so that the inward conveying direction of the tray 10 is changed by the guide roller 70.

As shown in FIGS. 14-1 and 15-1, it is not necessary to reverse the rotary frame 38 by 180 degrees.

As described above, according to the present invention, the rotary frame carrying the spindle motor, the clamper, and the pickup is reversed while a disk is conveyed in the outward conveying direction so that the opposite sides of the disk can be played.

Accordingly, it is possible to provide a double-sided disk player without a large external size as in the case of a double-sided disk player of the type in which the disk is reversed. The apparatus according to the present invention is particularly effective for LP records, laser disks, etc.

Further, the cost of the player can be substantially reduced in comparison with the system in which two pickups are provided for the respective A and B sides.

Further, even in the case of a disk having opposite sides bonded to each other, and therefore after having eccentricity between the two sides, there is not possibility of tracking error according due to the eccentricity resulting from playing one side of the disk while supporting the center of the other side.

In accordance with the invention, a disk player having a disk loading device can carry out double-sided playing only by the addition of the rotary frame. Accordingly, it is not necessary to design an entirely new disk loading device. Moreover, the overall structure is relatively simple.

The spindle motor, the pickup, and the clamper are all provided on the rotary frame, and hence the relative positional accuracy among these elements can be made high.

The rigidity of the pickup can be increased in comparison with the system in which the pickup is reversed.

As described above, according to the present invention, the rotary frame carrying the spindle motor, the clamper, and the pickup is reversed while a disk is conveyed out into the inward conveying position so that the opposite sides of the disk can be played, and there is a difference in the height of the disk conveying path of the tray between playing of the A side and playing of the B side.

Accordingly, even if the gap between the spindle and the clamper attached to the rotary frame differs in the direction of height between playing of the A side and playing of the B side, it is possible to accurately guide the disk into the gap between the spindle and the clamper.

Therefore, it is possible to provide a difference between the rotary center of the rotary frame and the position of the above-mentioned gap, and hence it is possible to make the height of the spindle motor and the clamper mechanism equal to the outer diameter of the rotary frame to thereby make the overall height of the apparatus small and make the apparatus compact.

Since such shifting of the tray in the direction of height can be used in a single-sided disk player, the single-sided disk player can be simplified in structure.

Also as described above, according to the present invention, the rotary frame carrying the spindle motor, the clamper, and the pickup is reversed while a disk is conveyed to the inward conveying position so that the opposite sides of the disk can be played, and the rotary center of the rotary frame is biased corresponding to a difference in size between the spindle and the clamper.

Accordingly, it is possible to reduce the size of the disk player because only the outer diameter of the rotary frame is only slightly larger than the distance from the lower end of the spindle motor to the upper end of the clamper in a single-sided playing disk player.

With respect to the vertical displacement of the gap between the spindle and the clamper due to the reversal of the rotary frame, the disk conveying path of the conveyer device is changed by the path changing mechanism provided in the conveyer device so that the disk can be conveyed into the gap with no difficulty.

Thus, there are many advantages in the apparatus according to the present invention.

What is claimed is:

1. A double-sided disk player comprising:
    a housing for housing said disk player;
    a spindle for rotating said disk; a clamper for pressing said disk against said spindle so
    that said disk is rotated by said spindle;
    a rotary frame carrying a pickup for reproducing a signal recorded on said disk;
    conveyor means for conveying said disk from a reproducing position whereat said disk is mounted on said spindle to a stand-by position whereat said disk is remote from said rotary frame to allow for the rotation thereof; and
    rotating means for rotating said rotary frame after said conveying means has conveyed said disk to said stand-by position.

2. The disk player of claim 1, wherein said conveyor means comprises a tray.

3. The disk player of claim 1, wherein said conveyor means comprises a plurality of feed rollers.

4. The disk player of claim 1, further comprising a spindle motor for rotating said spindle, said spindle motor, said spindle and said clamper being mounted on said rotary frame.

5. The disk player of claim 4, wherein said rotary frame comprises a pair of generally circular side frames, and a clamper frame and a spindle frame extending between said side frames.

6. The disk player of claim 5, wherein a gear is formed on an outer circumference of one of said side frames, and wherein said rotating means comprises a reversible motor and gear means coupled between an output shaft of said motor and said gear formed on said one of said one of said side frames.

7. The disk player of claim 1, wherein said conveyor means comprises means for lowering a disk between playing of a first side thereof and playing a second side thereof.

8. The disk player of claim 1 wherein when said disk is disposed in said stand-by position said clamper is separated from said spindle by a gap therebetween, said gap being vertically displaced when said rotary frame is rotated from a first position to a second position 180° therefrom due to the eccentricity of said gap with respect to the center of rotation of said rotary frame, said disk player further comprising means for vertically adjusting a conveying path of said disk such that said disk can be horizontally conveyed into said gap when said rotary frame is in said first or second position.

9. The disk player of claim 1, wherein said stand-by position is the eject position whereat the tray projects outside said housing such that disks can be interchanged.

* * * * *